(12) United States Patent
Hinds et al.

(10) Patent No.: US 7,681,388 B1
(45) Date of Patent: Mar. 23, 2010

(54) AGRICULTURAL HARVESTER WITH SIMULTANEOUS AND INDEPENDENT SEED AND BIOMASS PROCESSING

(75) Inventors: Michael L. Hinds, Thibodaux, LA (US); John S. Hickman, Bettendorf, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 12/358,432

(22) Filed: Jan. 23, 2009

(51) Int. Cl.
*A01D 41/08* (2006.01)
*A01D 45/00* (2006.01)

(52) U.S. Cl. .................................. 56/126; 56/62; 56/63

(58) Field of Classification Search .................... 56/63, 56/62, 13.9, 14.5, 56, 71, 14.6, 126; 460/44, 460/98, 100
See application file for complete search history.

(56) References Cited

U.S. PATENT DOCUMENTS

| | | | | |
|---|---|---|---|---|
| 3,144,743 A * | 8/1964 | Gaunt et al. | .................. | 56/14.3 |
| 3,599,404 A * | 8/1971 | Fernandez et al. | ........... | 56/12.8 |
| 3,791,114 A * | 2/1974 | Fowler | ...................... | 56/13.9 |
| 4,270,337 A | 6/1981 | Pinto | | |
| 4,272,947 A * | 6/1981 | Mizzi | ............................. | 56/63 |
| 5,131,216 A * | 7/1992 | Otten et al. | .................... | 56/56 |
| 5,379,577 A * | 1/1995 | Caillouet | ..................... | 56/14.3 |
| 5,463,856 A * | 11/1995 | Beckwith | ....................... | 56/62 |
| 5,485,716 A * | 1/1996 | Baker | ........................ | 56/14.3 |
| 5,816,036 A * | 10/1998 | Caillouet | ....................... | 56/63 |
| 6,076,340 A * | 6/2000 | Fowler | ....................... | 56/13.9 |
| 6,230,477 B1 * | 5/2001 | Caillouet | ..................... | 56/14.5 |
| 6,272,820 B1 | 8/2001 | Otten et al. | | |
| 6,363,700 B1 * | 4/2002 | Fowler | ....................... | 56/13.9 |
| 6,869,356 B2 * | 3/2005 | Hinds | ......................... | 460/70 |
| 6,910,321 B2 * | 6/2005 | Hinds | ............................ | 56/63 |
| 7,040,980 B1 | 5/2006 | Kestel | | |
| 7,398,638 B2 * | 7/2008 | Malmros et al. | ............... | 56/56 |

* cited by examiner

*Primary Examiner*—Árpád Fábián-Kovács

(57) ABSTRACT

A harvester for crops including biomass crop material and seed heads. The harvester includes a base unit, a biomass harvester sub-system for harvesting the biomass crop material, and a seed harvester sub-system for harvesting the seed heads. The biomass harvester sub-system includes a biomass harvester carried by the base unit. The seed harvester sub-system is carried by the base unit and operable independent from the biomass harvester sub-system, whereby the biomass crop material and seed heads are processed independently from each other within the harvester.

17 Claims, 6 Drawing Sheets

AGRICULTURAL HARVESTER WITH SIMULTANEOUS AND INDEPENDENT SEED AND BIOMASS PROCESSING

FIELD OF THE INVENTION

The present invention relates to agricultural harvesters, and, more particularly, to harvesters for harvesting stalk-like crops.

BACKGROUND OF THE INVENTION

Two known types of stalk-like crops in the North American market are sugar cane and sorghum. Other stalk or cane type crops are recently receiving more attention with increased interest in bio-energy such as miscanthus, energy cane and giant reed. During the harvesting of sugar cane, it is known to "top" the sugar cane plant by cutting off the top portion of the plant using a separate cutter head and allowing the top of the plant to simply fall to the ground.

Sorghum is a major cereal grain that is one of the oldest known crops and is used as a staple food in many places in Africa and Asia. Sorghum is a major feed grain crop in the U.S., Mexico, Argentina, Australia, and South Africa. It is believed that sorghum was introduced into the United States in the 1700's and some believe that Benjamin Franklin introduced the first grain sorghum crop. The seed of grain sorghum is the smallest of the major spring planted field crops, such as corn and soybeans Sorghum is a member of the grass family that is classified into four groups, those being: grain sorghums, grass sorghums, sweet sorghums, and broomcorn. Broomcorn is grown for the brush or the branches of the seed cluster with the fibers thereof being used for the making of brooms. Sweet sorghums are grown for the production of sorghum syrup which is produced from the juices pressed from the stems that is then subsequently boiled to the proper thickness. Animal feed and silage can also be made from sweet sorghums. Grassy sorghums are grown for green feed and hay, often reaching 10 feet in height. Grain sorghums are grown especially for their rounded, starchy seeds. Some grain sorghums grow as much as 15 feet or more tall with the seed being used as seed grain and the plant utilized for silage. Nearly all grain sorghums are much shorter than the other three types of sorghum and as such the collection devices used to collect seed typical grain sorghum are not ideal for collecting seed from very tall cane crops.

The use of sorghum for the production of ethanol has brought additional emphasis to the economics of sorghum production. It is known to gather sorghum grain by utilizing a regular grain header on a combine that is utilized to cut the heads from the sorghum and then process the heads through the threshing portion of a combine. A row crop attachment can be utilized to help the pickup and intake of the crop. The row crop attachments fit in front of the grain header cutter bar and have gathering points, gathering chains, and kicker wheels like a forage harvester head. Sorghum stems often catch and choke the straw walkers of a combine causing inconvenience and lost time in the cleaning of the straw walkers. Grain sorghum stalks are smaller and normally wetter to harvest than corn stalks and are more likely to be chopped up and delivered into the grain tank. Pieces of stalk return to the cylinder in the tailings and can exacerbate this condition. To handle this situation the chaffer section may be covered with sheet metal to keep the stalks out of the return flow to the cylinder.

For the harvesting of the sorghum stalk, sugar cane harvesters can be utilized that cut the stalk into billets for transfer to a wagon for further processing. Sugar cane harvesters may include a top cutting tool for the cutting off of the seed portion of the sugar cane. The seed portion of the sugarcane plant is discarded in this harvesting system since it has low amounts of sugar content. In the harvesting operation it is advantageous to use a height of cut that is substantially close to the surface of the ground to optimize the amount of the stalk harvested yet high enough to minimize any damage to the equipment by contact with the ground. Another problem with harvesting the cane too close to the ground results in increased damage to the plant, thereby decreasing the long term productivity of the cane plantation.

What is needed in the art is a sorghum or stalk-like crop harvester which removes and separately processes both the seed and biomass material in an effective and efficient manner.

SUMMARY OF THE INVENTION

The invention in one form is directed to a harvester for harvesting both stalks and upper seed heads of stalk-like crops. The harvester includes a base unit and a base cutter carried by the base unit. The base cutter is configured for harvesting the stalks. A seed harvester is carried by the base unit and positioned above the base cutter. The seed harvester includes a seed removal unit and a seed conveyance.

The invention in another form is directed to a harvester for crops including biomass crop material and seed heads. The harvester includes a base unit, a biomass harvester sub-system for harvesting the biomass crop material, and a seed harvester sub-system for harvesting the seed heads. The biomass harvester sub-system includes a biomass harvester carried by the base unit. The seed harvester sub-system is carried by the base unit and operable independent from the biomass harvester sub-system, whereby the biomass crop material and seed heads are processed independently from each other within the harvester.

DETAILED DESCRIPTION OF THE INVENTION

Figure 1:
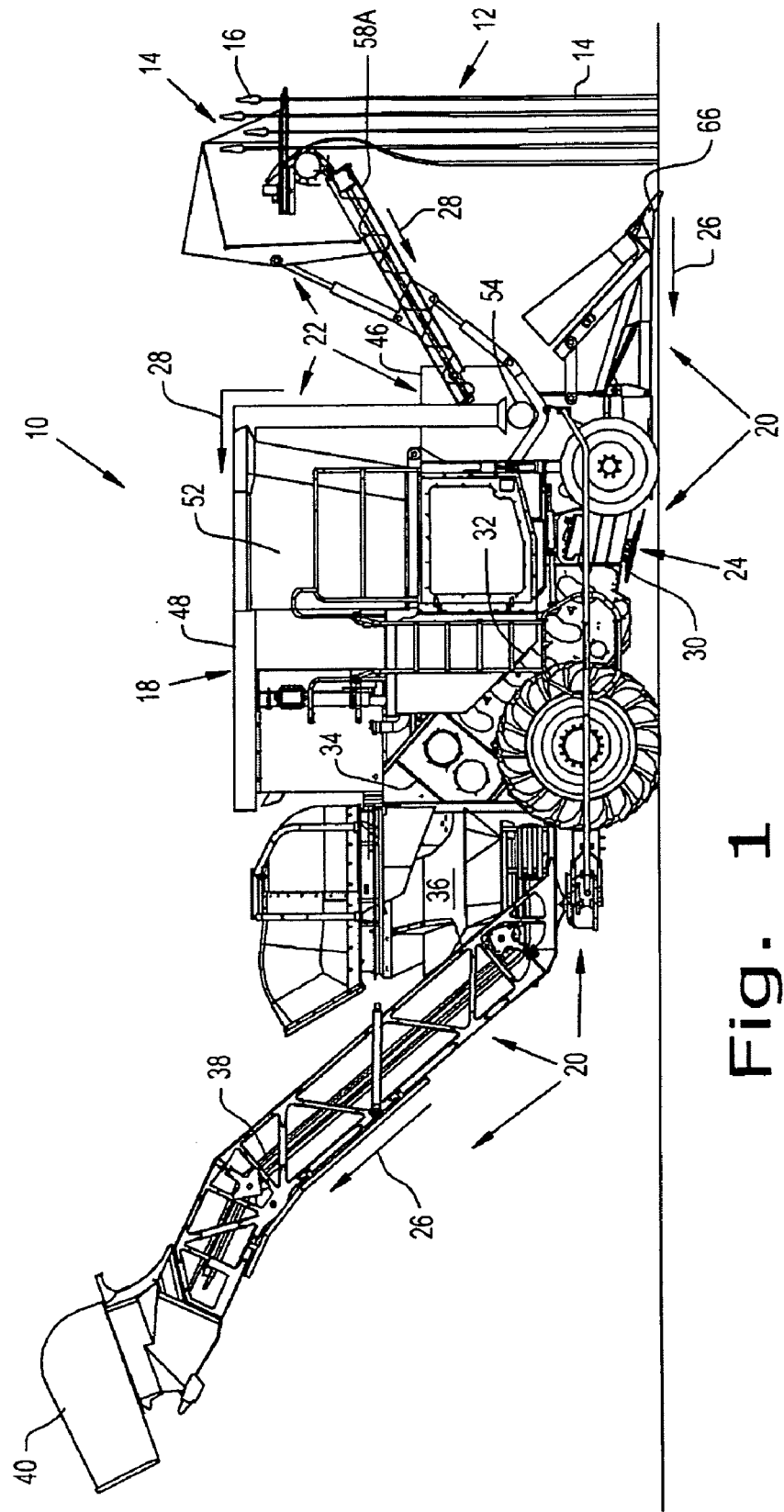
FIG. 1 is a side view of an embodiment of an agricultural harvester of the present invention.
Figure 2:
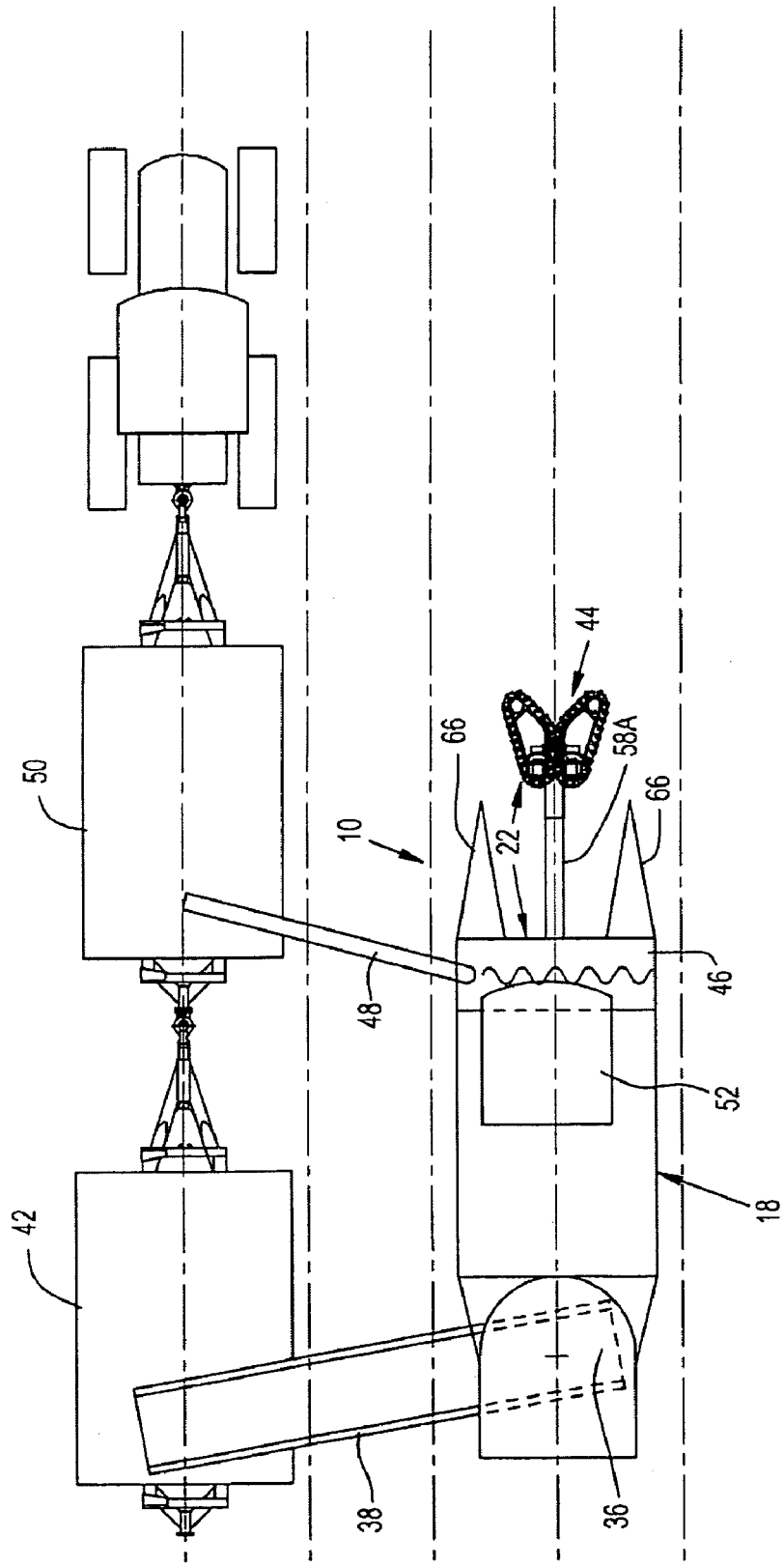
FIG. 2 is a top view of the harvester shown in FIG. 1, illustrating simultaneous unloading of both seed crop material and biomass crop material.

Referring now to FIGS. 1 and 2, there is shown an embodiment of an agricultural work machine in the form of a harvester 10 for a stalk-like crop 12 including both biomass crop material 14 and upper seed heads 16. The biomass crop material 14 may include both stalks and leaves, each of which may have value for certain applications, such as livestock feed, sugar production, ethanol production, etc. In the embodiment shown, crop 12 is in the form of sweet sorghum but could be a different type of crop.

Harvester 10 generally includes a base unit 18 carrying both a biomass harvester sub-system 20 and seed harvester sub-system 22. Each of biomass harvester sub-system 20 and seed harvester sub-system 22 are carried by the frame of base unit 18, with seed harvester sub-system 22 being positioned generally above biomass harvester sub-system 20. Biomass harvester sub-system 20 is used for harvesting the biomass crop material 14, and seed harvester sub-system 22 is used for separately and independently harvesting and processing seed from seed heads 16.

More particularly, biomass harvester sub-system 20 has a general flow path 26 of biomass crop material 14 through harvester 10 (FIG. 1) which is below a general flow path 28 of seed from the seed heads 16 through seed harvester sub-system 22. The separate flow paths 26 and 28 allow the biomass crop material 14 and seed crop material from seed heads 16 to be separately processed and off-loaded from harvester 10.

Biomass harvester sub-system 20 includes a biomass harvester 24 carried by base unit 18. The biomass harvester 24 includes a base cutter 30 which cuts the stalks of crop 12 near ground level. The biomass harvester sub-system 20 further includes a set of feed rollers 32, chopper unit 34, temporary storage bin 36 (also referred to as an "elevator basket"), elevator 38 and secondary extractor 40. Each of feed rollers 32, chopper unit 34, elevator 38 and secondary extractor 40 are of conventional construction on a sugar cane harvester and thus not described further herein. For example, chopper unit 34 chops the stalks of the biomass crop material into predetermined size billets.

However, according to an aspect of the present invention, temporary storage bin 36 at the downstream side of chopper unit 34 provides temporary holding of biomass crop material 14 prior to being discharged from secondary extractor 40 into a dump wagon 42 or other suitable portable container (FIG. 1). The ability to temporarily hold the biomass crop material onboard harvester 10 can be beneficial, e.g., when opening a field where the dump wagon 42 cannot drive along side of harvester 10.

Seed harvester sub-system 22 generally includes a seed harvester 44, grain storage tank 46, and discharge conveyance 48. Discharge conveyance 48 is used to discharge the processed seed from grain storage tank 46 to a dump wagon 50 or other suitable portable container (FIG. 1). In the illustrated embodiment, discharge conveyance 48 is configured as an auger, but could also be configured, e.g., as a belt conveyor or chain conveyor.

Grain storage tank 46 is carried onboard base unit 18, preferably at the front of the operator's station 52 on base unit 18. Grain storage tank 46 may be constructed with a suitable shape (such as a rectangular shape with a V-bottom) from a suitable material (such as a metal or plastic). A cross-auger 54 positioned in the V-bottom moves the processed seed toward discharge conveyance 48. Cross-auger 54 and discharge conveyance 48 may be actuated using a single actuator, such as an electronic switch on a console panel within operator's station 52.

Figure 3:
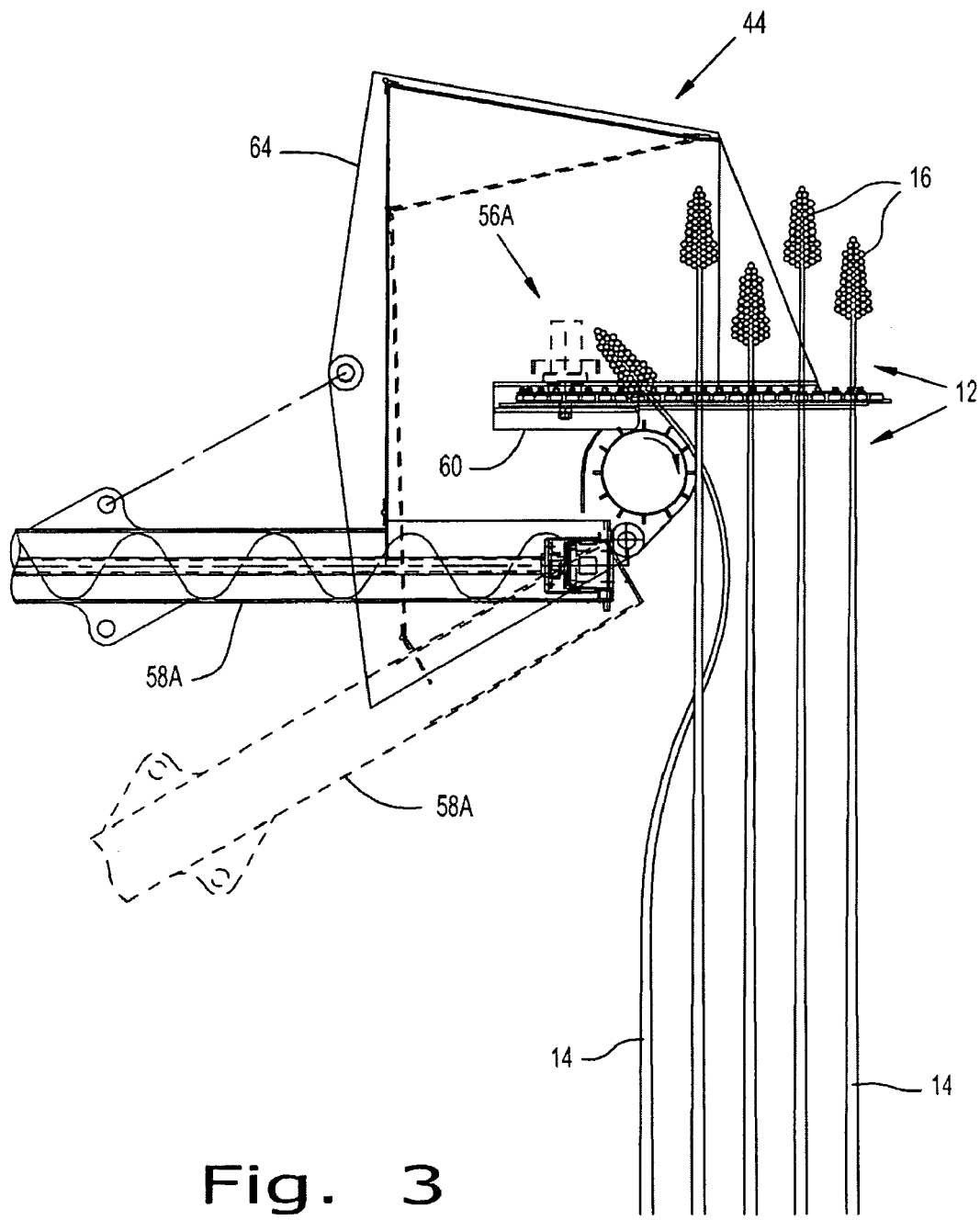
FIG. 3 is a side, partially sectional view of one embodiment of a seed harvester of the present invention.
Figure 4:
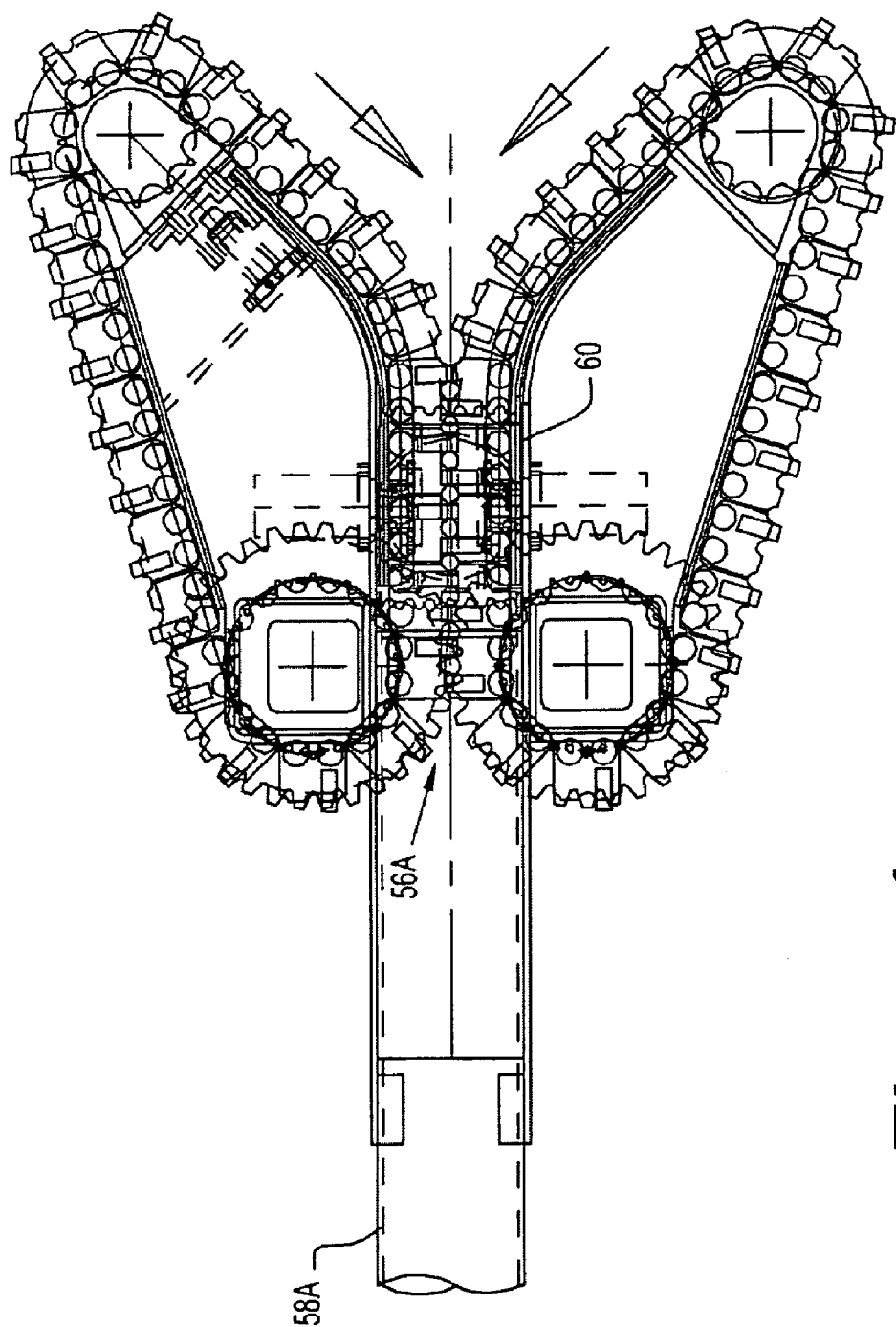
FIG. 4 is a top view of the seed harvester shown in FIG. 3.

Seed harvester 44 is positioned above and forward of base cutter 30 (relative to a working direction of harvester 10). Seed harvester 44 generally includes a seed removal unit 56 and seed conveyance 58. Seed conveyance 58 conveys the seed or seed heads from seed harvester 44 to base unit 18 for further processing within seed harvester sub-system 22. In FIGS. 3 and 4, seed conveyance 58A is configured as an auger for transporting seeds to base unit 12, whereas in FIGS. 5 and 6, seed conveyance 58B is configured as a chain conveyor for transporting seed heads to base unit 12. However, seed conveyance 58 can be differently configured depending on the application, such as a cleated belt, etc.

Figure 5:
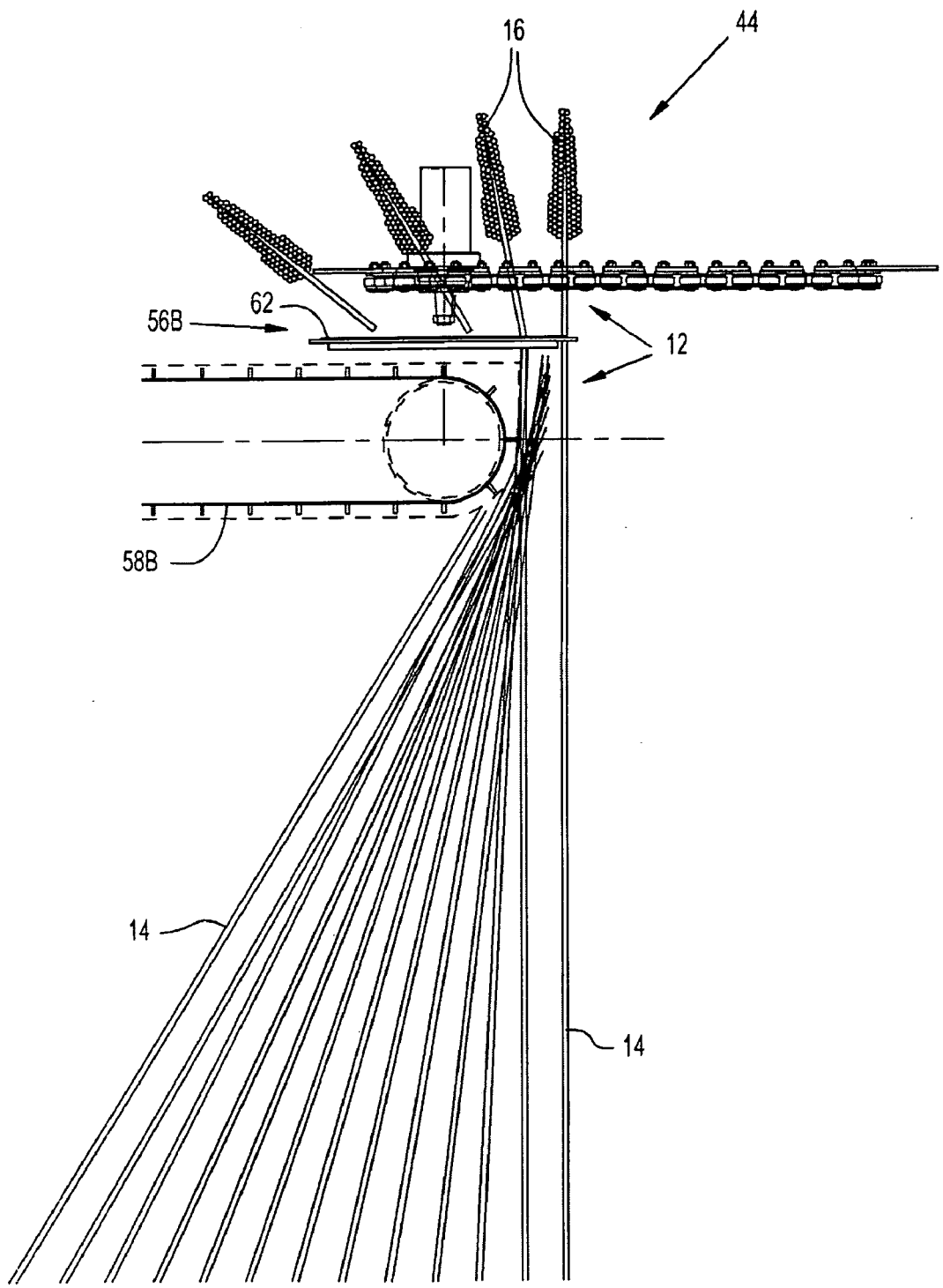
FIG. 5 is a side, partially sectional view of another embodiment of a seed harvester of the present invention.
Figure 6:
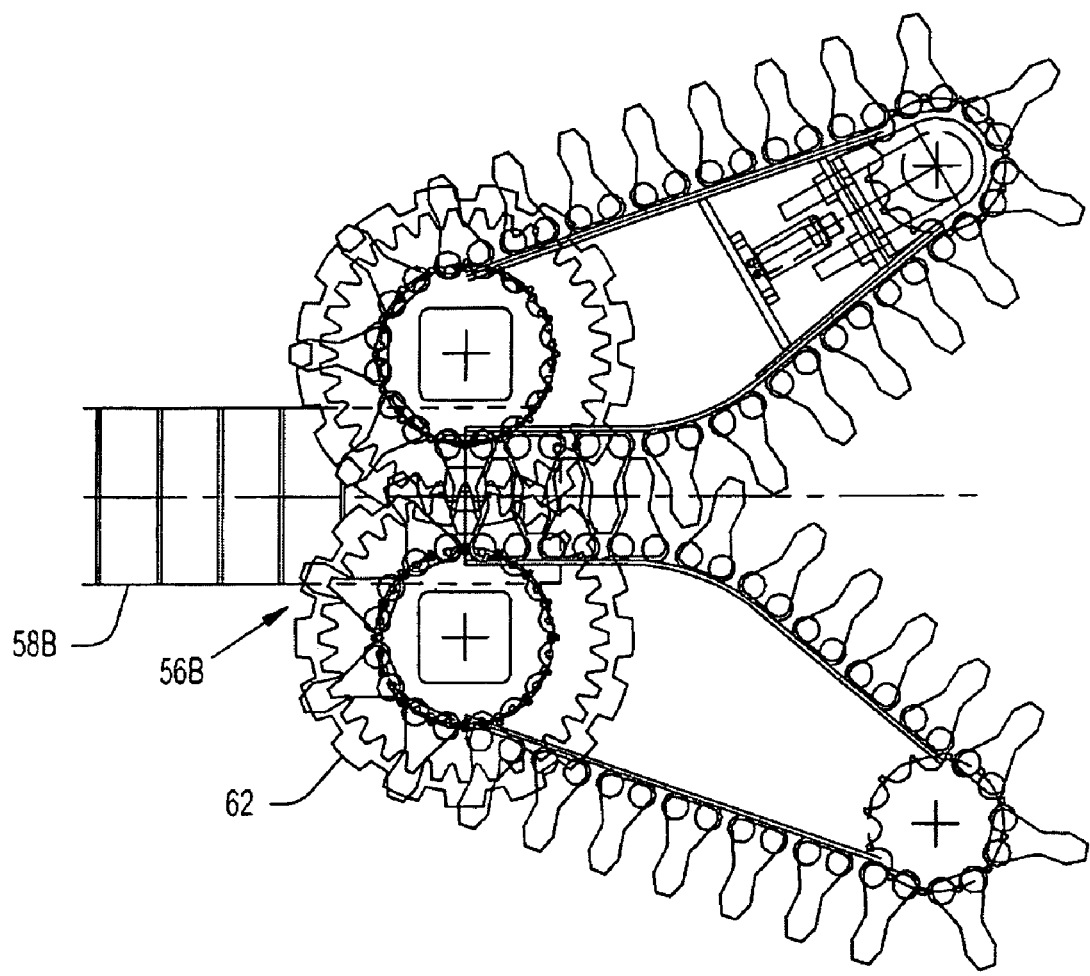
FIG. 6 is a top view of the seed harvester shown in FIG. 5.

Seed removal unit 56 harvests the seed from seed heads 16 by either cutting off and subsequently processing the entire seed head 16, or by stripping the seeds from seed heads 16. Referring to FIGS. 3 and 4, a seed removal unit 56A is shown including a seed stripper 60 which strips the seeds from seed heads 16. Referring to FIGS. 5 and 6, a seed removal unit 56B is shown including a seed head cutter 62 for cutting seed heads 16 from the stalks of crop 12.

During a field operation, and referring to FIGS. 3 and 4, the seeds are stripped from seed heads 16 using seed stripper 60. The seeds are held in a grain gathering tunnel 64, which can accommodate a changing height of seed removal unit 56A, and thus accommodate a changing angular orientation relative to auger 58A. The seed is conveyed through auger 58A to grain storage tank 46 where it is held until discharged from base unit 18 using discharge conveyance 48. Concurrently, the biomass crop material (i.e., stalks and leaves) are aligned with snout 66, cut off with base unit 18, conveyed to chopper unit 34 using feed rollers 32, and deposited in temporary storage bin 36. The biomass crop material can then be selectively discharged from temporary storage bin 36 by an operator through engagement of elevator 38 and secondary extractor 40.

The method of operation of seed removal unit 56B shown in FIGS. 5 and 6 is similar to the method of operation described above with respect to FIGS. 3 and 4. The primary difference is that the entire seed heads 16 are cut from the remainder of the crop plant and subsequently processed within base unit 18. For example, the seeds may be removed from the seed heads using a suitable threshing assembly onboard base unit 18 prior to the threshed and cleaned seed being deposited within grain storage tank 46.

Having described the preferred embodiment, it will become apparent that various modifications can be made without departing from the scope of the invention as defined in the accompanying claims.

The invention claimed is:

1. A harvester for harvesting both stalks and upper seed heads of stalk-like crops, said harvester comprising:
    a base unit;
    a base cutter carried by said base unit, said base cutter configured for harvesting the stalks;
    a seed harvester carried by said base unit and positioned above said base cutter, said seed harvester including a seed removal unit and a seed conveyance;
    a grain storage tank carried by said base unit; and,
    a discharge conveyance in communication with said grain storage tank, said seed harvester being in communication with said grain storage tank.

2. The harvester of claim 1, wherein said seed removal unit includes a seed head cutter for cutting said seed heads from said stalks.

3. The harvester of claim 1, wherein said seed removal unit includes a seed stripper for stripping seeds from the seed heads.

4. The harvester of claim 1, wherein said seed conveyance includes one of a belt conveyor, a chain conveyor and an auger.

5. The harvester of claim 1, wherein said seed harvester is positioned forward of said at least one base cutter, relative to a working direction of said base unit.

6. The harvester of claim 1, wherein said harvester includes at least one chopper unit for chopping the stalks into billets.

7. The harvester of claim 6, including a temporary storage bin located downstream from said chopper unit for temporarily storing the stalks onboard the harvester prior to being discharged from said harvester.

8. A harvester for crops including biomass crop material and seed heads, said harvester comprising:
   a base unit;
   a biomass harvester sub-system for harvesting the biomass crop material, said biomass harvester sub-system including a biomass harvester carried by said base unit; and
   a seed harvester sub-system for harvesting the seed heads, said seed harvester sub-system having a grain storage tank carried by said base unit and a discharge conveyance in communication with said grain storage tank, said seed harvester being in communication with said grain storage tank and said seed harvester sub-system being carried by said base unit and operable independent from said biomass harvester sub-system, whereby the biomass crop material and seed heads are processed independently from each other within said harvester.

9. The harvester of claim 8, wherein said biomass harvester sub-system has a general flow path of the biomass through said harvester which is below a general flow path of seed from the seed heads through said harvester.

10. The harvester of claim 8, wherein said biomass harvester includes a base cutter.

11. The harvester of claim 10, wherein said seed harvester sub-system includes a seed harvester positioned above said base cutter, said seed harvester including a seed removal unit and a seed conveyance.

12. The harvester of claim 8, wherein said seed removal unit includes a seed head cutter for cutting said seed heads from said stalks.

13. The harvester of claim 8, wherein said seed removal unit includes a seed stripper for stripping seeds from the seed heads.

14. The harvester of claim 8, wherein said seed conveyance includes one of a belt conveyor, a chain conveyor and an auger.

15. The harvester of claim 8, wherein said seed harvester is positioned forward of said at least one base cutter, relative to a working direction of said base unit.

16. The harvester of claim 8, wherein said harvester includes at least one chopper unit for chopping the stalks into billets.

17. The harvester of claim 16, including a temporary storage bin located downstream from said chopper unit for temporarily storing the biomass crop material.

* * * * *